(12) United States Patent
Fraccon et al.

(10) Patent No.: US 7,745,763 B2
(45) Date of Patent: Jun. 29, 2010

(54) METHOD FOR BAKING BREAD USING STEAM

(75) Inventors: Stefania Fraccon, Varese (IT); Tamara Distaso, Gemonio (IT); Karen M. Embury, St. Joseph, MI (US); M. Sells Joel, Hartford, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 854 days.

(21) Appl. No.: 11/110,063

(22) Filed: Jul. 11, 2005

(65) Prior Publication Data
US 2007/0104844 A1 May 10, 2007

(51) Int. Cl.
*A21B 1/40* (2006.01)
*A21D 8/06* (2006.01)

(52) U.S. Cl. .................. 219/413; 219/401; 219/518; 99/331; 99/468; 99/470; 426/496; 426/510; 426/523

(58) Field of Classification Search .................. None
See application file for complete search history.

(56) References Cited

U.S. PATENT DOCUMENTS

| 213,029 | A | | 3/1879 | Ashcroft |
|---|---|---|---|---|
| 339,228 | A | | 4/1886 | Smith |
| 1,332,216 | A | | 3/1920 | Hodge and Robinson |
| 1,544,481 | A | * | 6/1925 | Reese .................. 126/20 |
| 1,870,459 | A | | 8/1932 | Klenk |
| 3,299,800 | A | | 1/1967 | Angelo |
| 3,364,338 | A | | 1/1968 | Holtkamp |
| 3,518,949 | A | | 7/1970 | Stock |
| 3,732,396 | A | | 5/1973 | Tucker |
| 3,751,632 | A | | 8/1973 | Kaurenen |
| 3,814,901 | A | | 6/1974 | Morhack |
| 3,815,949 | A | | 6/1974 | Ulert |
| 3,839,616 | A | | 10/1974 | Risman |
| 4,011,805 | A | | 3/1977 | Vegh et al. |

(Continued)

FOREIGN PATENT DOCUMENTS

DE          3909283 A1      10/1990

(Continued)

OTHER PUBLICATIONS

European Search Report for EP1724529.

(Continued)

*Primary Examiner*—Joseph M Pelham
(74) *Attorney, Agent, or Firm*—John W. Morrison; McGarry Bair PC

(57) ABSTRACT

A method of baking bread using steam in an automated household oven with a cooking cavity and a steam system for introducing steam into the cooking cavity comprises determining a presence of bread in the cooking cavity and introducing steam into the cooking cavity upon a positive determination of the presence of bread. After the positive determination, the steam is introduced into the cavity to maintain a desired relative humidity in the cavity for a predetermined period of time to aid in formation of a moist, flexible crust on the bread, and the amount of steam introduced into the cavity decreases after the predetermined period of time. The cavity can be preheated and prehumidified prior to the determining of the presence of the bread in the cooking cavity.

22 Claims, 6 Drawing Sheets

U.S. PATENT DOCUMENTS

| | | | |
|---|---|---|---|
| 4,058,635 A | 11/1977 | Durth | 426/233 |
| 4,245,148 A | 1/1981 | Gisske et al. | |
| 4,426,923 A | 1/1984 | Ohata | |
| 4,623,780 A | 11/1986 | Shelton | |
| 4,724,824 A | 2/1988 | McCoy et al. | |
| 4,737,373 A | 4/1988 | Forney | |
| 4,817,582 A | 4/1989 | Oslin et al. | |
| 4,876,426 A | 10/1989 | Smith | |
| 4,906,485 A * | 3/1990 | Kirchhoff | 426/506 |
| 4,913,039 A | 4/1990 | Sutphen | |
| 4,920,948 A | 5/1990 | Koether et al. | |
| 4,924,071 A | 5/1990 | Jacobs | |
| 4,924,072 A | 5/1990 | Oslin | |
| 4,991,545 A | 2/1991 | Rabe et al. | |
| 5,075,120 A | 12/1991 | Leary et al. | |
| 5,075,121 A * | 12/1991 | Desage et al. | 426/233 |
| 5,077,065 A | 12/1991 | Ash et al. | |
| 5,171,974 A | 12/1992 | Koether et al. | 219/506 |
| 5,215,000 A * | 6/1993 | Desage et al. | 99/331 |
| 5,235,902 A | 8/1993 | Ogawa et al. | |
| 5,279,676 A | 1/1994 | Oslin et al. | |
| 5,318,792 A | 6/1994 | Tippmann | |
| 5,367,145 A | 11/1994 | Takagi | |
| 5,369,252 A | 11/1994 | Kondo | |
| 5,411,753 A | 5/1995 | Tippmann | |
| 5,463,940 A | 11/1995 | Cataldo | |
| 5,494,690 A | 2/1996 | Shelton | 426/233 |
| 5,512,312 A | 4/1996 | Forney et al. | |
| 5,525,782 A | 6/1996 | Yoneno et al. | |
| 5,532,456 A | 7/1996 | Smith et al. | |
| 5,549,038 A | 8/1996 | Kolvites | |
| 5,619,983 A | 4/1997 | Smith | 126/348 |
| 5,631,033 A | 5/1997 | Kolvites | 426/233 |
| 5,662,959 A | 9/1997 | Tippmann | |
| 5,694,835 A | 12/1997 | Mangina | |
| 5,710,409 A | 1/1998 | Schwarzbacker et al. | |
| 5,756,970 A | 5/1998 | Barger et al. | |
| 5,768,982 A | 6/1998 | Violi et al. | 99/476 |
| 5,938,959 A | 8/1999 | Wang | |
| 5,942,142 A | 8/1999 | Forney et al. | |
| 5,945,018 A | 8/1999 | Halen | |
| 5,967,020 A * | 10/1999 | Soyama et al. | 99/327 |
| 6,023,050 A | 2/2000 | Violi | |
| 6,035,763 A | 3/2000 | Yung | 99/348 |
| 6,133,558 A | 10/2000 | Ueda et al. | |
| 6,175,100 B1 | 1/2001 | Creamer et al. | 219/401 |
| 6,233,464 B1 | 5/2001 | Chmaytelli | |
| 6,318,246 B2 | 11/2001 | Fukushima et al. | 99/330 |
| 6,323,467 B1 | 11/2001 | Alsafadi | |
| 6,342,262 B1 | 1/2002 | Wuest | |
| 6,497,907 B2 * | 12/2002 | Hofer | 426/233 |
| 6,521,871 B1 | 2/2003 | Shelton | |
| 6,545,251 B2 | 4/2003 | Allera et al. | 219/394 |
| 6,565,762 B1 | 5/2003 | Silverbrook | |
| 6,570,136 B1 | 5/2003 | Lockwood et al. | |
| 6,572,911 B1 | 6/2003 | Corcoran et al. | 426/510 |
| 6,727,478 B2 | 4/2004 | Rael et al. | |
| 6,743,454 B1 | 6/2004 | Gibson et al. | |
| 6,773,738 B2 | 8/2004 | Berger et al. | 426/510 |
| 6,815,644 B1 * | 11/2004 | Muegge et al. | 219/413 |
| 6,833,032 B1 | 12/2004 | Douglas et al. | |
| 6,900,414 B2 * | 5/2005 | Fisher | 219/401 |
| 6,909,070 B2 * | 6/2005 | Veltrop et al. | 219/401 |
| 6,909,071 B2 | 6/2005 | Shozo | |
| 7,060,941 B1 | 6/2006 | Embury et al. | 219/401 |
| 7,199,340 B2 | 4/2007 | Yamasaki et al. | |
| 7,208,701 B2 | 4/2007 | Fraccon et al. | |
| 7,235,762 B2 * | 6/2007 | Gagas et al. | 219/401 |
| 2001/0051202 A1 * | 12/2001 | Hofer | 426/523 |
| 2002/0179588 A1 | 12/2002 | Lubrina et al. | |
| 2004/0022909 A1 | 2/2004 | Holm et al. | |
| 2004/0226934 A1 | 11/2004 | Moore, Jr. et al. | |
| 2004/0232141 A1 | 11/2004 | Yamasaki et al. | |
| 2004/0261632 A1 | 12/2004 | Hansen et al. | |
| 2005/0034718 A1 * | 2/2005 | Van Over | 126/369.2 |
| 2005/0051036 A1 | 3/2005 | Erdmann et al. | |
| 2006/0000821 A1 | 1/2006 | Gerola et al. | |
| 2006/0249136 A1 | 11/2006 | Reay | |
| 2006/0251784 A1 | 11/2006 | Sells et al. | |
| 2007/0138160 A1 * | 6/2007 | Ando et al. | 219/401 |
| 2008/0032018 A1 | 2/2008 | Garniss et al. | |

FOREIGN PATENT DOCUMENTS

| | | | |
|---|---|---|---|
| DE | 10335295 | | 3/2005 |
| EP | 0 233 535 | | 8/1987 |
| EP | 0233535 | A2 | 8/1987 |
| EP | 0517681 | A2 | 12/1992 |
| EP | 0643923 | A1 | 3/1995 |
| EP | 0768055 | A1 | 4/1997 |
| EP | 0893084 | A1 | 1/1999 |
| EP | 0894460 | A1 | 2/1999 |
| EP | 1010384 | A1 | 6/2000 |
| EP | 1166694 | A1 | 1/2002 |
| EP | 1372358 | A1 | 12/2003 |
| EP | 1382280 | | 1/2004 |
| FR | 2589678 | A1 | 5/1987 |
| FR | 2652234 | A1 | 3/1991 |
| FR | 2840392 | A1 | 12/2003 |
| GB | 2373714 | A | 10/2002 |
| GB | 2400298 | A | 10/2004 |
| JP | 57077829 | A | 5/1982 |
| JP | 2001346549 | A | 12/2001 |
| KR | 2002006215 | A | 1/2002 |
| SU | 500788 | A * | 6/1976 |
| WO | 9534220 | A1 | 12/1995 |
| WO | 9734991 | A1 | 9/1997 |
| WO | 98/52418 | | 11/1998 |
| WO | 99/53767 | | 10/1999 |
| WO | 03/023285 | | 3/2003 |

OTHER PUBLICATIONS

European Search Report for EP1744104.
European Search Report for EP1761111.
European Search Report for EP1719414.
European Search Report for EP1724530.

* cited by examiner

| Stage | Time (minutes) | Temperature (°F) | Upper Heating Element Duty Cycle | Lower Heating Element Duty Cycle | Boiler Duty Cycle |
|---|---|---|---|---|---|
| 1 | 10 | 25 above set temperature | 100 | 100 | 0 |
| 2 | 4 | 25 above set temperature | 100 | 100 | 100 |
| 3 | Variable | 25 above set temperature | 100 | 100 | 100 |
| 4 | 1-2 | Set temperature | 15 | 100 | 50 |
| 5 | Variable | Set temperature | 5 | 100 | 0 |

Fig. 6

METHOD FOR BAKING BREAD USING STEAM

BACKGROUND OF THE INVENTION

1. Field of the Invention

The invention relates to a method for baking bread in an automated household oven using steam.

2. Description of the Related Art

The quality of baked bread depends on several factors, including preparation of the dough, including kneading, shaping, and rising, baking of the dough, and storage of the bread after baking. During the baking process, leavening agents expand the dough, and a crust forms at the outside layer of the dough. A commonly known leavening agent is yeast, which releases carbon dioxide as a by-product of digestion to expand the dough. The timing of the crust formation process is critical because it affects not only the properties (i.e., thickness, texture, and color) of the crust but also the expansion of the dough within the crust. The crust preferably forms first as a moist and pliable crust, which becomes rigid and crisp later in the baking process to give the bread a desired outer texture and appearance. The moist and pliable crust formed at the outer layer of the dough in the initial few minutes of baking the bread is generally flexible and expands with the dough so that the dough can fully expand. When the outside layer of the dough sets as a crisp and generally inflexible crust, gases in the dough can no longer expand to increase the loaf size; thus, it is preferred that the formation of the crisp crust does not occur until later in the baking process. If the crisp crust formation happens too early, the gases from the leavening agents cannot expand the dough and consequently build up pressure within the loaf. Eventually, the trapped gases undesirably crack the crisp crust for release to the surrounding environment. Adding steam to the baking environment helps form the desired moist, flexible crust in the initial stages of baking and delays the setting of the hard, crisp crust. As a result, the gases can fully expand the loaf and do not form cracks in the crust. During the last stages of baking, the steam is removed to create a dry oven, which is required for the formation of the crisp crust, and the presence of too much steam in the last stages of baking results in an undesirable crust. Additionally, the steam in the initial baking stages gelatinizes starch on the outside layer of the dough, which dries out near the end of baking after the steam is removed to help formation of the crisp, brown crust.

Ovens found in most homes today are usually not equipped with a system to introduce steam into the oven cavity during the bread baking process. In response, bread bakers have developed several home remedies for supplying steam into the oven cavity. Such remedies include spraying the dough with water while the oven preheats, placing a pan in the oven before preheating and filling the pan with water when placing the dough in the oven, spraying water onto the walls of the oven with a spray bottle after the placing the dough in the oven and continuing to do so until the loaf begins to color, and throwing ice cubes on the bottom of the oven to create steam. Another method involves forming holes in the bottom of a muffin tin, placing the tin on the bottom rack of the oven, filling the tin with boiling water about a minute before putting the dough in the oven so the water drips onto the bottom of the oven and creates steam, and removing the tin after about five to ten minutes.

While the home remedies succeed at introducing steam into the oven cavity, they are relatively inconvenient and unpredictable, thereby leading to inconsistent results. The water or ice introduced into the oven cavity vaporizes to create steam, which fills the oven cavity. The amount of steam in the oven can be quantified as a relative humidity, and the degree of relative humidity affects crust formation. Because the water or ice is manually introduced, the quantity of steam and, therefore, the relative humidity, are not regulated, and, further, the relative humidity is not regulated as a function of the cooking cycle time. As a result, the relative humidity in the oven cavity can differ from ideal conditions at various times during the baking process and lead to premature formation of the crisp crust or insufficient formation of the crisp crust at the end of the baking process. Further, some the methods require the baker to periodically check on the bread and add more water or ice to the cavity if necessary. This process can be inconvenient to a baker who desires to leave the bread unattended after placing the dough in the oven. Some higher end contemporary ovens incorporate an automated steam generating system that can be used to bake bread. These ovens eliminate the need for the baker to manually introduce water or ice into the cavity.

SUMMARY OF THE INVENTION

A method of baking bread using steam according to one embodiment of the invention during a cooking cycle in an automated household oven with a cooking cavity and a steam system for introducing steam into the cooking cavity comprises determining a presence of bread in the cooking cavity and introducing steam into the cooking cavity upon a positive determination of the presence of bread.

The determining of the presence of the bread can comprise sensing the presence of the bread. The can sensing of the presence of the bread can comprise sensing an opening and closing of a door that selectively closes the cooking cavity. The determining of the presence of the bread can alternatively comprise reading a user input signal from a control panel of the oven. The method can further comprise reading a user selected bread cooking cycle from a control panel of the oven.

The introducing of the steam into the cooking cavity can occur for a predetermined period of time. The predetermined period of time can be in a range of about 1 to 2 minutes. The introducing of the steam into the cooking cavity can comprise maintaining a desired relative humidity in the cooking cavity.

The method can further comprise preheating the cooking cavity to a first predetermined temperature prior to the determining the presence of the bread. The cooking cavity can be uniformly heated to the first predetermined temperature during the preheating of the cooking cavity. The method can further comprise prehumidifying the cooking cavity prior to the determining of the presence of the bread. The prehumidifying can begin after the preheating. The preheating can have a duration of about 10 minutes. The prehumidifying can have a duration of about 4 minutes. The method can further comprise continuing to preheat and prehumidify the cooking cavity until the positive determination of the presence of the bread.

The method can further comprising reducing the temperature of the cooking cavity to a second predetermined temperature from the first predetermined temperature during the introducing of the steam into the cooking cavity. The reducing of the temperature of the cooking cavity can comprise reducing a duty cycle of an upper heating element of the heating system.

The method can further comprising introducing a gradually decreasing amount of steam into the cooking cavity after the predetermined period of time. The method can further comprise terminating the introducing of the gradually decreasing amount of steam prior to the end of the cooking cycle. The method can further comprise maintaining the temperature of the cooking cavity at the second predetermined temperature until the end of the cooking cycle.

The method can further comprise running a convection fan during the cooking cycle to circulate air in the cooking cavity.

BRIEF DESCRIPTION OF THE DRAWINGS

In the drawings:

FIG. 6 is a table of exemplary parameters for implementation of the method of baking bread shown in FIGS. 4 and 5.

DESCRIPTION OF THE PREFERRED EMBODIMENT

Figure 1:
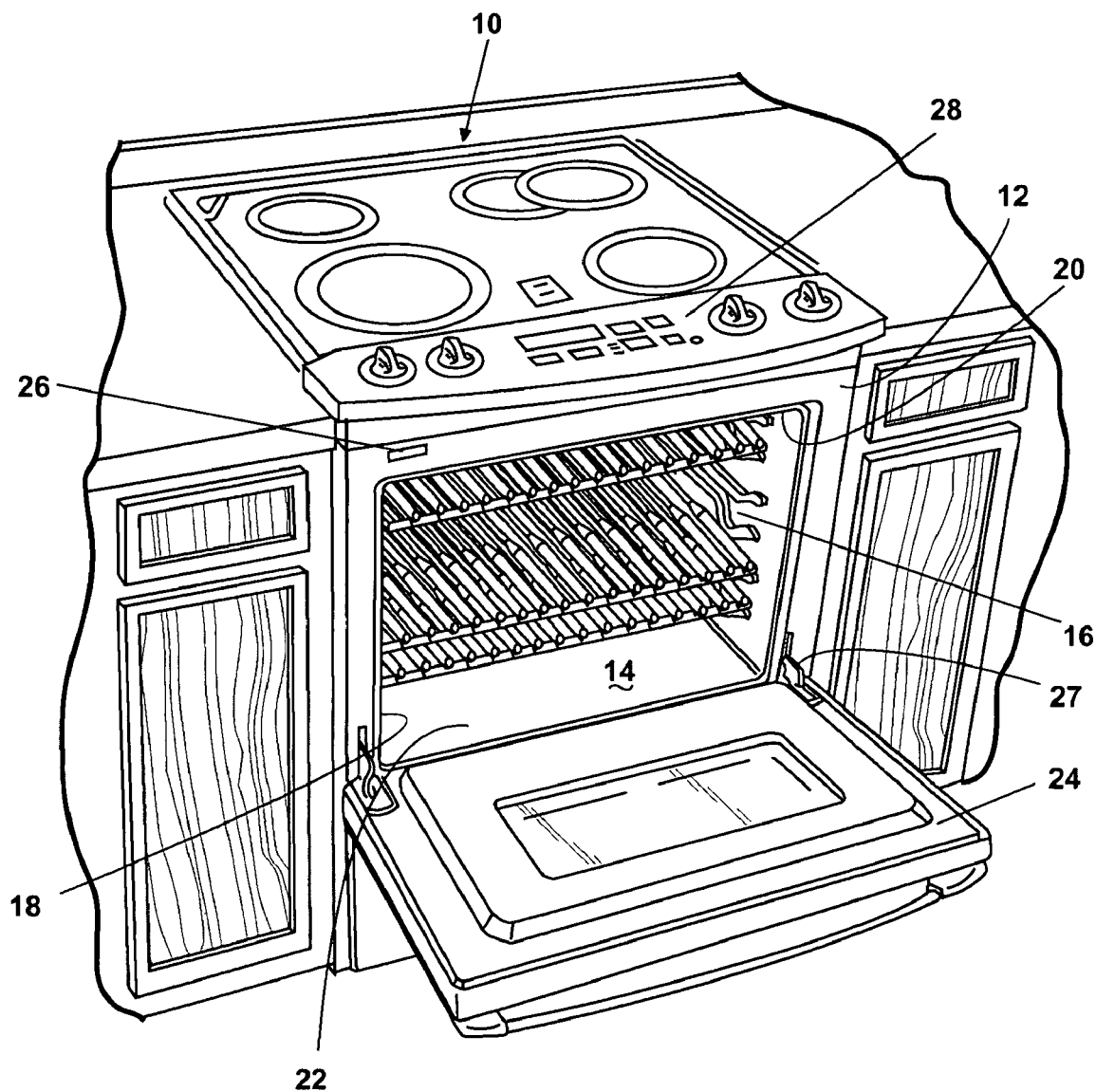
FIG. 1 is a perspective view of an exemplary automatic household oven.
Figure 2:
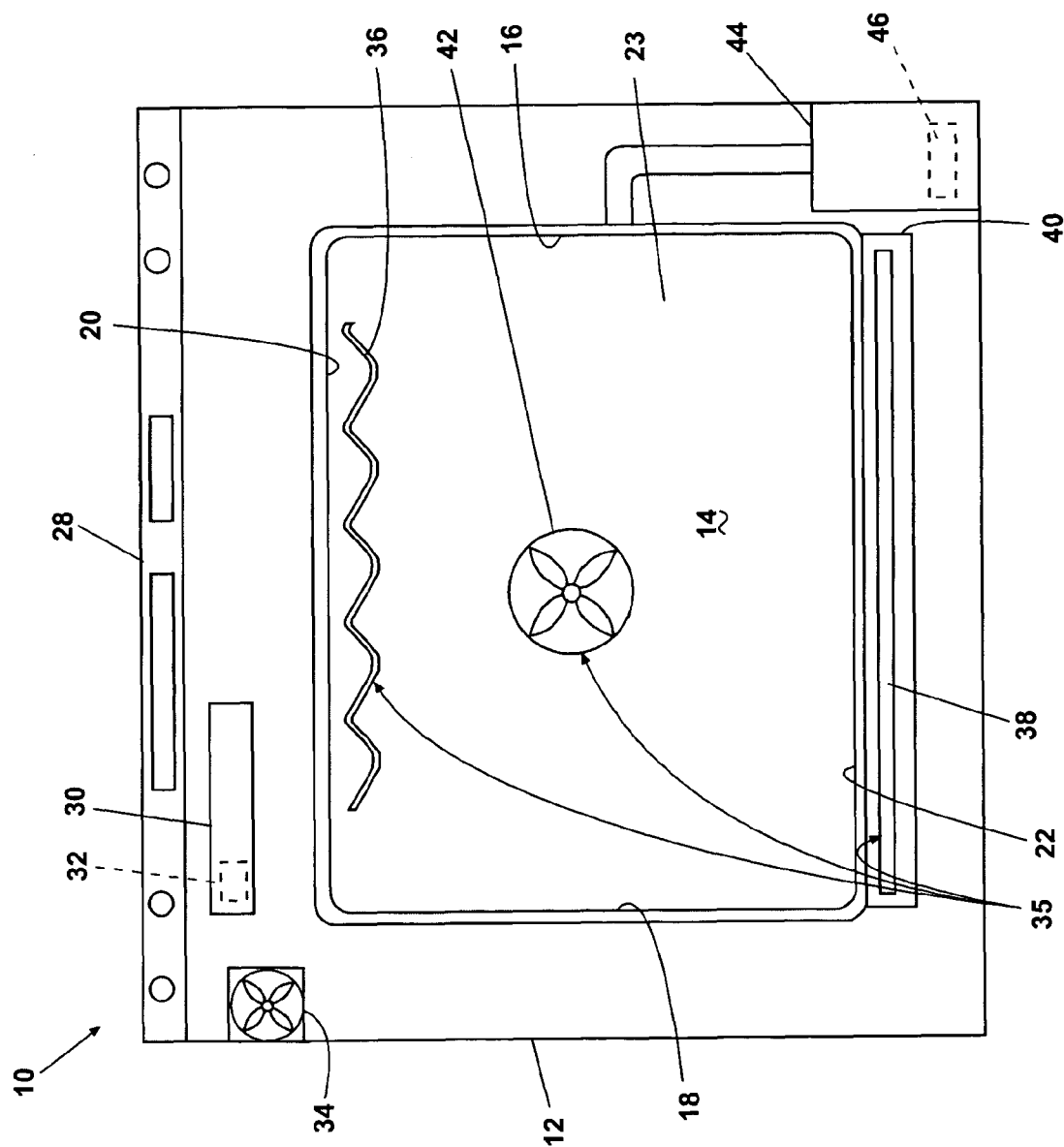
FIG. 2 is a schematic view of the oven of FIG. 1.

Referring now to the figures, FIG. 1 illustrates an exemplary automatic household oven 10 that can be used to implement a method for baking bread with steam according to one embodiment of the invention. The oven 10 comprises a cabinet 12 with an open-face cooking cavity 14 defined by cooking cavity walls: a pair of spaced side walls 16, 18 joined by a top wall 20, a bottom wall 22, and a rear wall 23 (FIG. 2). A door 24 selectively closes the cavity 14, and a sensor 26 detects an open position of the door 24 and a closed position of the door 24. In the open position, the door 24 is generally horizontal, as shown in FIG. 1, and can pivot about a hinge 27, as is well known in the oven art, about ninety degrees to the closed position where the door 24 is generally vertical (not shown). However, the door 24 can be oriented in any suitable position when in the open and closed positions and is not limited to the horizontal and vertical positions. When the door 24 is in the open position, a user can access the cavity 14, while the door 24 in the closed position prevents access to the cavity 14 and seals the cavity 14 from the external environment. The door sensor 26 can be a well-known mechanically activated sensor that is biased to an extended position and depresses when the door 24 is in the closed position to open or close an electrical circuit. Alternatively, the sensor 26 can be an infrared sensor, a sonic sensor, or any other suitable type of sensor for detecting the open and closed positions of the door 24.

The oven 10 further comprises a control panel 28 accessible to the user for inputting desired cooking parameters, such as temperature and time, of manual cooking programs or for selecting automated cooking programs. The control panel 28 communicates with a controller 30 located in the cabinet 12, as shown in FIG. 2. The controller 30 can be a proportional-integral-derivative (PID) controller or any other suitable controller, as is well-known in the automatic oven art. The controller 30 stores data, such as default cooking parameters, the manually input cooking parameters, and the automated cooking programs, receives input from the control panel 28, and sends output to the control panel 28 for displaying a status of the oven 10 or otherwise communicating with the baker. Additionally, the controller 30 includes a timer 32 for tracking time during the manual and automated cooking programs and a cooling fan 34 located in the cabinet 12 for drawing cooling air into the cabinet 12 and directing the air toward the controller 30 to avoid overheating of the controller 30 by heat conducted from the cavity 14. The cooling air flows around the outside of the cooking cavity walls 16, 18, 20, 22, 23.

With continued reference to FIG. 2, the oven 10 further comprises a heating system 35 having an upper heating element 36, commonly referred to as a broiler, and a lower heating element 38. The schematic illustration of the FIG. 2 shows the lower heating element 38 as being hidden or mounted beneath the cooking cavity bottom wall 22 in a heating element housing 40. Heat from the lower heating element 38 conducts through the bottom wall 22 and into the cavity 14. Alternatively, the lower heating element 38 can be mounted inside the cavity 14, as is well-known in the oven art. Further, the upper and lower heating elements 36, 38 can be mounted at the side walls 16, 18 of the cavity 14, as disclosed in U.S. Pat. No. 6,545,251 to Allera et al., which is incorporated herein by reference in its entirety. The heating system 35 according to the illustrated embodiment further comprises a convection fan 42 that circulates air and steam, when present, within the cavity 14. The convection fan 42 can be any suitable fan and can be mounted in any suitable location of the cavity 14, such as in the rear wall 23.

In addition to the heating system, the oven 10 comprises a steam system 44 preferably mounted within the cabinet 12 and configured to introduce steam into the cavity 14. The steam system 44 in the illustrated embodiment comprises a boiler 46 that heats water stored in the steam system 44. However, the steam system 44 can be any suitable system that is capable of introducing steam directly into the cavity 14 or introducing water that is turned into steam in the cavity 14 and is not limited to the system shown schematically in FIG. 2.

Figure 3:
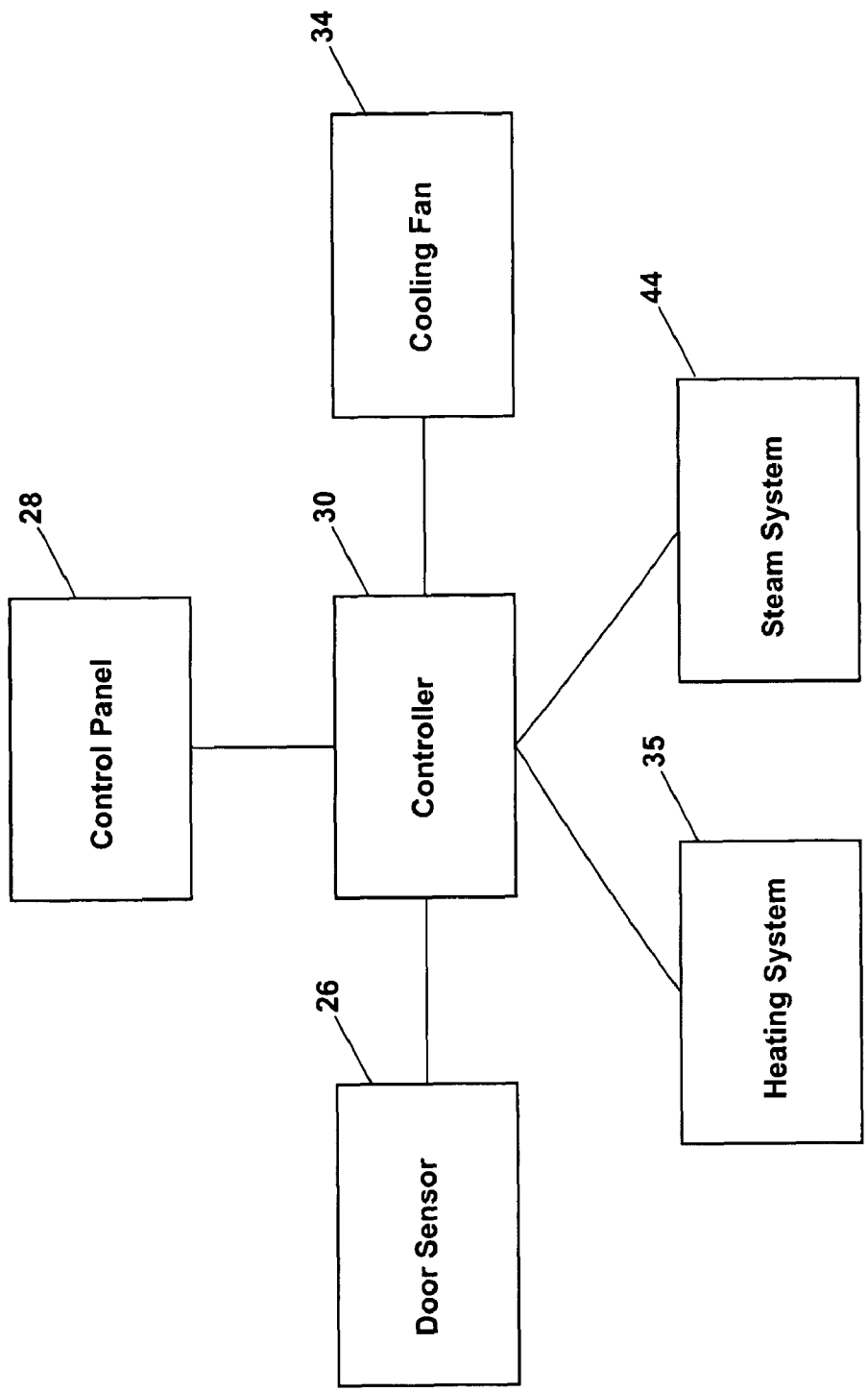
FIG. 3 is a schematic diagram illustrating a controller of the oven of the FIG. 1 and exemplary components in operative communication with the controller for executing a method of baking bread according to one embodiment of the invention.

FIG. 3 is a block diagram that schematically illustrates a control system of the oven 10. The control system comprises the controller 30, which operably communicates with the control panel 28, as described above, the door sensor 26, the cooling fan 34, the heating system 35, and the steam system 44. The door sensor 26 communicates to the controller 30 the open or closed position of the door 24, and the controller 30 communicates with the cooling fan 34 to activate or deactivate the cooling fan 34 to control the temperature of the controller 30. The controller 30 instructs the heating system 35 to activate or deactivate the upper heating element 36, the lower heating element 38, and the convection fan 42, either all together, individually, or in groups, and provides instructions regarding the desired temperature of the cavity 14 and the rate at which the heating system 35 heats the cavity 14. Similarly, the controller 30 instructs the steam system 44 to activate or deactivate the boiler 46 and provides instructions regarding the desired temperature of the water in the steam system 44 in order to achieve the desired relative humidity in the cavity 14.

As stated above, the exemplary oven 10 can be used to implement a method 50 of baking bread with steam according to one embodiment of the invention. The method 50 comprises several stages during which the heating system 35 operates to control a temperature of the cavity 14 and the steam system 44 operates to control a relative humidity of the cavity 14. The temperature and the relative humidity during the stages are selected to produce a bread item having a desired loaf size, a desired texture of the bread inside the crust, and a crust with desired characteristics, such as thickness, texture, and color. As used herein, the term "bread item" refers to any type of baked good that is formed from dough and forms a crust during the baking process. Examples of bread items include, but are not limited to, white bread, wheat bread, whole wheat bread, wholemeal bread, sourdough bread, ciabatta, whole grain bread, mixed grain bread, focaccia, crown loaf bread, hard dough bread, scofa, rye bread, kibbled wheat bread, cracked wheat bread, onion bread, and damper bread.

Figure 4:
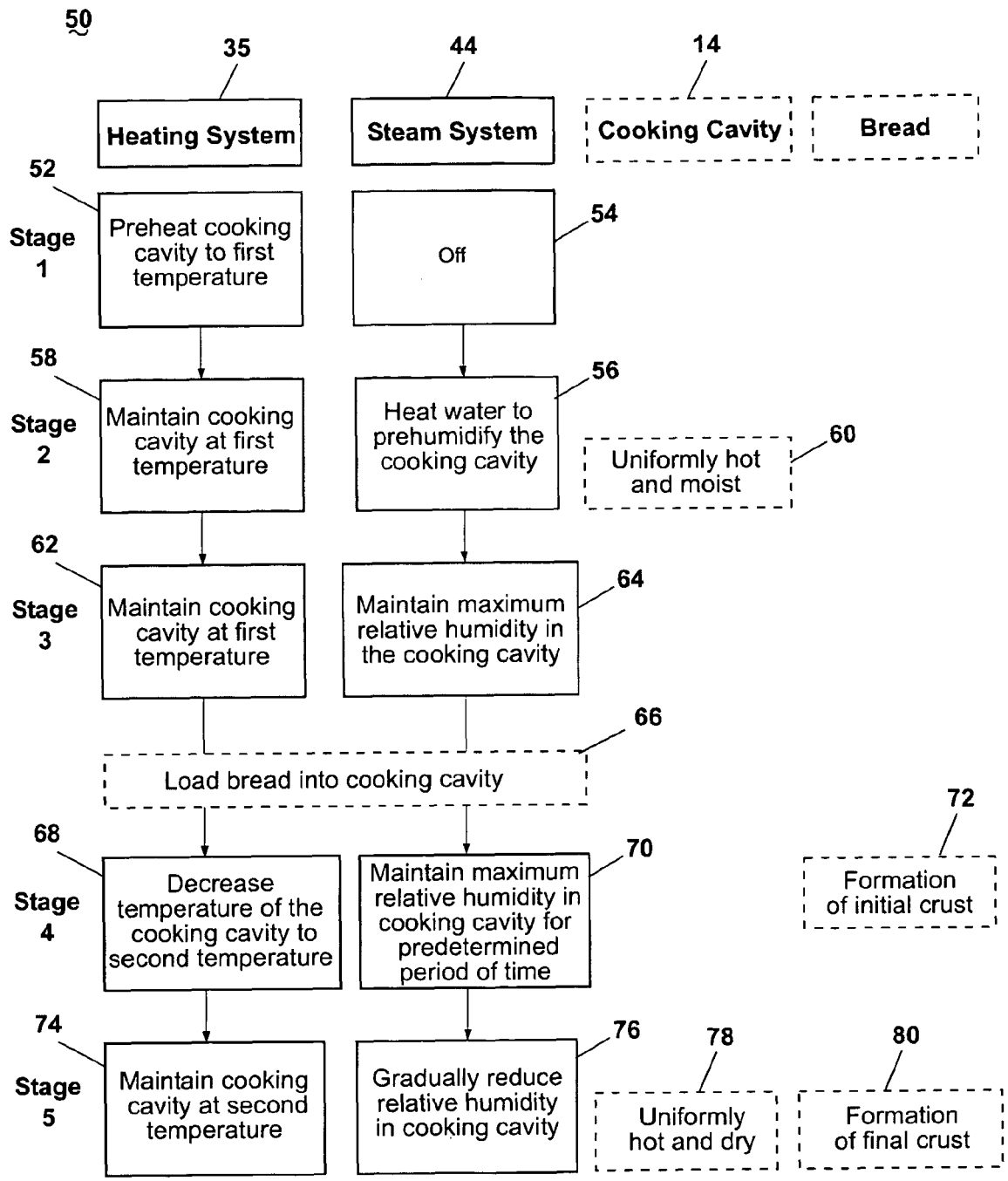
FIG. 4 is a schematic diagram illustrating a method of baking bread according to one embodiment of the invention.
Figure 5:
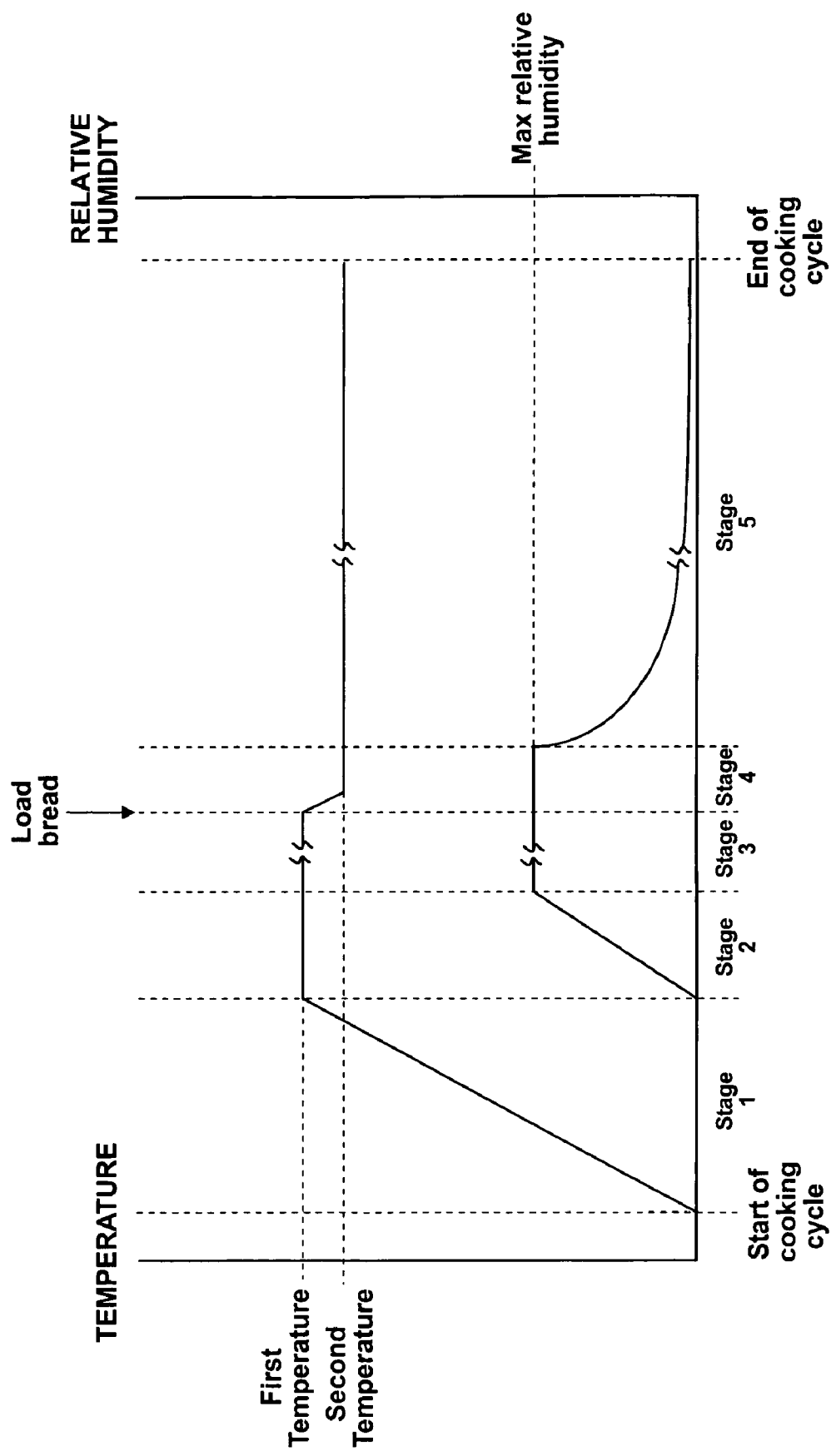
FIG. 5 is a schematic graph illustrating a temperature and a relative humidity in a cooking cavity of the oven of FIG. 1 during the execution of the method of baking bread shown in FIG. 4.

The stages of the method 50 according to one embodiment of the invention are shown in a flow chart in FIG. 4, which presents the functions of the heating system 35 and the steam system 44 during each stage of the method 50, and the corresponding temperature of the cavity 14 and the relative humidity of the cavity 14 for the stages are schematically illustrated in FIG. 5. FIG. 5 is not intended to report actual behavior of the temperature and the relative humidity during the method 50; rather, FIG. 5 represents a general behavior of these properties. It will be apparent to one of ordinary skill in the oven art that, in reality, the actual temperature and the actual relative humidity fluctuate about a target temperature and a target relative humidity during the operation of an oven.

During the first two stages of the method 50, the bread item is not yet placed in the cavity 14. In general, stage 1 can be referred to as a dry preheat stage where the heating system 35 heats the cavity 14 to a first temperature (step 52) and the steam system 44 is off or not activated (step 54). According to one embodiment of the invention, the first temperature is a temperature greater than a set temperature, which is a temperature at which the bread is baked following loading of the bread in the cavity 14. The set temperature can be a temperature entered by a user or set by the automatic cooking program. During this stage, the cavity 14 preferably becomes uniformly heated to the first temperature. The term "uniformly heated" refers to all spaces in the cavity 14, the walls 16, 18, 20, 22, 23 of the cavity 14, and items, such as baking racks, baking stones, and baking trays, in the cavity 14 achieving the first temperature. A uniformly heated cavity results in a higher quality bread item with consistent final characteristics. When the cavity 14 is uniformly heated and the baker opens and closes the door 24, the temperature of the cavity 14 almost immediately returns to the temperature of the cavity 14 prior to the opening of the door 24. Preferably, the baker places a bread item support, such as a baking stone or baking tray, in the cavity 14 prior to stage 1 so that the bread item support becomes uniformly heated during stage 1. Heating the cavity 14 above the set temperature helps to ensure that the cavity 14 is uniformly heated to at least the set temperature for baking the bread after the bread is loaded into the cavity 14. Stage 1 terminates when the cavity 14 reaches the first temperature or after a predetermined period of time.

Stage 2 follows stage 1 and can be generally referred to as a prehumidify stage where the steam system 44 activates to heat the water, such as by the boiler 46, to prehumidify the cavity 14 (step 56). Waiting until the end of stage 1 to initiate the steam system 44 ensures that the temperature of the cavity 14 is high enough to sustain steam in a vaporized state. As a result, the vapor will not condense in the cavity 14 and form water droplets on the walls 16, 18, 20, 22, 23, the bread, or any other items in the cavity 14. Formation of water droplets on porcelain, which is a material found on the cavity walls 16, 18, 20, 22, 23 of many ovens, can undesirably damage the material. When the water in the steam system 44 reaches its boiling point, the steam begins to enter the cavity 14 and raises the relative humidity in the cavity 14. Concurrently, the heating system 35 maintains the cavity 14 at the first temperature (step 58) and continues to uniformly heat the cavity 14. By the end of stage 2, the cavity 14 reaches a condition where it is uniformly hot and moist, as shown by reference numeral 60 FIG. 4. As used herein, "moist" refers to a condition where the relative humidity of the cavity 14 is greater than the relative humidity of the cavity 14 prior to the introduction of steam and is at a level desired for initial baking of the bread item. Preferably, the relative humidity reaches a maximum relative humidity during stage 2 or by the end of stage 2.

Stage 1 and stage 2 essentially prepare the cavity 14 for the bread item. Because a properly prepared cooking cavity 14 leads to more consistent and higher quality breads, the environment in the cavity 14 achieves the desired conditions, i.e., uniformly hot and moist, for the initial baking period prior to placing the bread item in the cavity 14.

When stage 2 ends, either upon the cavity 14 reaching a desired relative humidity, such as the maximum relative humidity, or after a predetermined period of time, stage 3 begins. During stage 3, the heating system 35 maintains the cavity 14 at the first temperature (step 62), and the steam system 44 maintains the desired or maximum relative humidity (step 64). At the same time, the controller 30 communicates with the control panel 28 to signal that the bread item can be loaded into the cavity 14. The signal can comprise any suitable visual signal, such as by displaying "LOAD" on the control panel 28, or audible signal, such as an alarm. Stage 3 continues until the oven 10 has determined that the baker has loaded the bread item in the cavity 14 (step 66); thus, the duration of stage 3 is variable. Bakers have varying preferences regarding the condition of the cavity 14 prior to loading the bread item, and some bakers prefer to preheat and prehumidify the cavity 14 for relatively long periods of time to ensure that the cavity 14 and the items contained therein are uniformly heated and that the relative humidity has reached the maximum relative humidity. Further, the baker might not be in the immediate vicinity of the oven 10 when the oven 10 communicates the signal, and the variable time of stage 3 ensures that stage 4 does not begin before the baker returns to the immediate vicinity of the oven 10 for loading the bread item into the cavity 14. According to one embodiment of the invention, the oven 10 determines a presence of the bread item through the door sensor 26. As described above, the door sensor 26 detects the open and closed positions of the door 24, and a cycle of opening the door 24 and closing the door 24 is indicative of the baker loading the bread item into the cavity 14. Alternatively, the presence of the bread item can be determined by the baker communicating that the bread item is loaded through a user interface on the control panel 28. The user interface can comprise, for example, a button, a touch pad, a touch screen, or a voice command unit. The presence of the bread item can alternatively be determined by other sensors, such as infrared sensors, in the cavity 14.

Upon a positive determination of the presence of the bread item in the cavity 14, stage 4 begins. During stage 4, the heating system 35 decreases the temperature of the cavity 14 to a second temperature, which is preferably the set temperature (step 68), and the steam system 44 maintains the desired or maximum relative humidity in the cavity 14 (step 70) for a predetermined period of time to assist in formation of the initial, flexible crust on the outer layer of the bread item, as indicated by reference numeral 72 in FIG. 4. The variable duration of stage 3 ensures that the bread item does not miss stage 4, which is critical and lasts only for the predetermined period of time.

When the predetermined period of time ends, stage 5 begins. During stage 5, the heating system 35 maintains the cavity 14 at the second temperature (step 74) while the steam system 44 decreases and/or terminates steam production. Because the amount of steam generated by the steam system 44 decreases while steam in the cavity 14 is lost through vents, the relative humidity of the cavity 14 gradually decreases (step 76). By the end of stage 5, the cavity 14 is uniformly hot and dry, as indicated by reference numeral 78 in FIG. 4. As used herein, "dry" refers to a condition where the relative humidity of the cavity 14 is relatively lower than "moist" and is at or near the relative humidity of the cavity 14 prior to the introduction of steam. A dry environment is necessary for formation near the end of stage 5, as indicated by reference numeral 80 in FIG. 4, of a final, hard crust having a desired thickness, texture, and color on the outer layer of the bread item. The duration of stage 5 can be variable and dependent on a user input cooking cycle time. In this circumstance, the duration of stage 5 is equal to the user input cycle time less the duration of stage 4. Alternatively, the duration of stage 5 can be set by an automatic cooking cycle.

An exemplary implementation of the method 50 with the oven 10 described above, along with exemplary operational parameter values, is presented below, with it being understood that the method 50 can be utilized with any suitable household oven 10 and that the implementation of the method 50 with different ovens can differ according to the oven utilized. The exemplary operational parameter values are shown in a table in FIG. 6.

During stage 1, the heating system 35 heats the cavity 14 to about 25° F. above the set temperature, which usually ranges between about 250° F. and 450° F. The duration of stage 1 is about 10 minutes, and the cavity 14 can reach the 25° F. above the set temperature before the end of the 10 minutes and at least by the end of the 10 minutes. The controller 30 instructs the heating system 35 to operate both the upper and lower heating elements 36, 38 at a 100% duty cycle and to activate the convection fan 42. An exemplary duty cycle is the percentage of time the heating element is on (i.e., power is supplied to the heating element) during a certain time interval, such as 1 minute.

After the 10 minutes, stage 2 begins, and the controller 30 instructs the heating system 35 to continue to operate the upper and lower heating elements 36, 38 at a 100% duty cycle to maintain the temperature at the 25° F. above the set temperature. Additionally, the steam system 44 communicates with the controller 30 and turns on the boiler 46 for operation at a 100% duty cycle. As with the heating elements 36, 38, an exemplary duty cycle for the boiler 46 is the percentage of time the boiler 46 is on (i.e., power is supplied to the boiler 46) during a certain time interval, such as 1 minute. Stage 2 has a duration of about 4 minutes, and stage 3 begins at the end of the 4 minutes. The operational conditions of the heating system 35 and the steam system 44 do not change from stage 2 to stage 3.

After the positive determination of the presence of the bread item in the cavity during stage 3, stage 4 begins. The duration of stage 4 depends on the desired characteristics of the final crust of the bread and can range from about 1 to 2 minutes, for example. During stage 4, the duty cycle of the upper heating element 36 reduces to decrease the temperature of the cavity to the set temperature and to reduce the amount of directly radiating heat on the bread because such radiation tends to quickly brown the crust. If too much direct heat is present, it can overheat and burn the outer surface of the bread item facing the upper heating element 36. The duty cycle of the upper heating element 36 can be reduced to about 15%, while the duty cycle of the lower heating element 38 remains at 100%. Further, the duty cycle of the boiler 46 reduces so that the steam system 44 continues to make enough steam to replace steam lost through vents or other means and maintain the maximum relative humidity for the about 1 to 2 minutes. The duty cycle can be reduced to about 50%.

Following the 2 minutes of stage 4, the controller initiates stage 5 by further decreasing the duty cycle of the upper heating element 36 to about 5% and deactivating the boiler 46 of the steam system 44 so that the boiler 46 discontinues heating of the water. As a result, the temperature of the water decreases, the amount of steam decreases, and the relative humidity of the cavity 14 gradually returns to or near the relative humidity of the cavity 14 prior to the introduction of the steam in stage 2. The duration of stage 5 is variable and depends on the user input cooking cycle time.

As mentioned above, the operational parameter values shown in FIG. 6 are dependent on the oven 10 utilized to implement the method. Different ovens have different types of heating systems (e.g., some ovens do not have the convection fan 42) and steam systems, which affect the implementation of the method 50. For example, the above operational parameter values were determined with the cooling fan 34 operational during the entire cooking cycle. Because the cooling fan can draw away heat from the cooking cavity 14 through the cooking cavity walls 16, 18, 20, 22, 23, the cooling fan can affect the temperature of the cavity 14.

When the baker desires to bake a bread item using the method 50, the baker prepares the dough for the bread item, opens the door 24, places the relative humidity of the cavity 14 prior to the introduction of the steam in stage 2. The duration of stage 5 is variable and depends on the user input cooking cycle time.

As mentioned above, the operational parameter values shown in FIG. 6 are dependent on the oven 10 utilized to implement the method. Different ovens have different types of heating systems (e.g., some ovens do not have the convection fan 42) and steam systems, which affect the implementation of the method 50. For example, the above operational parameter values were determined with the cooling fan 34 operational during the entire cooking cycle. Because the cooling fan can draw away heat from the cooking cavity 14 through the cooking cavity walls 16, 18, 20, 22, 23, the cooling fan can affect the temperature of the cavity 14.

When the baker desires to bake a bread item using the method 50, the baker prepares the dough for the bread item, opens the door 24, places the bread item support in the cavity 14, and closes the door 24. Next, the user selects a "BREAD" cooking cycle on the oven 10 through the control panel 28. The baker also enters the set temperature and the cooking cycle time, if needed, through the control panel 28. The oven 10 implements the method 50, and in stage 3, the controller 30 communicates with the control panel 28 to produce the signal for the baker to load the bread. Either immediately or after waiting a desired amount of time, the baker opens the door 24, places the bread item on the bread item support, and closes the door 24. The cycle of opening and closing the door 24 is sensed by the door sensor 26, which communicates to the controller 30 that the bread item is in the cavity 14. Alternatively, the oven 10 determines the presence of the bread item in another manner, as described previously. In response, the controller 30 initiates stage 4, during which the bread item forms the initial, flexible crust and begins to expand. Following stage 5, the baker removes the bread item, which has the desired final, hard crust, from the cavity 14.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of baking bread using steam during a cooking cycle in an automated household oven with a cooking cavity, a steam system for introducing steam into the cooking cavity, a heating system for heating the cooking cavity, a control panel, and a controller operably coupled to and controlling the steam system, the heating system, and the control panel for implementing the cooking cycle, the method comprising:
receiving input from the user regarding the selection of a bread cooking cycle having a cooking time and cooking temperature via the control panel;
preconditioning the cooking cavity by actuating the heating system to increase the temperature of the cooking cavity to a first temperature greater than the cooking temperature and greater than a vaporization temperature of water;
indicating to the user the completion of the preconditioning of the cooking cavity via the control panel;
maintaining the temperature of the cooking cavity at the first temperature after the indicating to the user of the completion of the preconditioning of the cooking cavity;
determining a presence of bread in the cooking cavity after the indicating to the user of the completion of the preconditioning of the cooking cavity based on at least one input received by the controller;
terminating the preconditioning of the cooking cavity after the determining of the presence of bread in the cooking cavity; and
after the terminating of the preconditioning of the cooking cavity, initiating the baking of the bread by:
reducing the temperature of the cooking cavity from the first temperature to the cooking temperature and then maintaining the temperature of the cooking cavity at the cooking temperature for the cooking time by actuating the heating system; and
introducing steam into the cooking cavity by activating the steam system.

2. The method according to claim 1, wherein the determining of the presence of the bread comprises sensing the presence of the bread.

3. The method according to claim 2, wherein the sensing of the presence of the bread comprises sensing an opening and closing of a door that selectively closes the cooking cavity.

4. The method according to claim 2 and further comprising reading a user selected bread cooking cycle from the control panel of the oven.

5. The method according to claim 1, wherein the determining of the presence of the bread comprises reading a user input signal from the control panel of the oven.

6. The method according to claim 1, wherein the introducing of the steam into the cooking cavity occurs for a predetermined period of time.

7. The method according to claim 6, wherein the predetermined period of time is in a range of about 1-2 minutes.

8. The method according to claim 6, wherein the introducing of the steam into the cooking cavity comprises maintaining a desired relative humidity in the cooking cavity.

9. The method according to claim 1 wherein the preconditioning of the cooking cavity comprises preheating the cooking cavity to the first predetermined temperature prior to the determining the presence of the bread.

10. The method according to claim 9, wherein the cooking cavity is uniformly heated to the first predetermined temperature during the preheating of the cooking cavity.

11. The method according to claim 9 wherein the preconditioning of the cooking cavity further comprises prehumidifying the cooking cavity prior to the determining of the presence of the bread.

12. The method according to claim 11, wherein the prehumidifying begins after the preheating.

13. The method according to claim 12, wherein the preheating has a duration of about 10 minutes.

14. The method according to claim 13, wherein the prehumidifying has a duration of about 4 minutes.

15. The method according to claim 11 further comprises continuing to preheat and prehumidify the cooking cavity until the determination of the presence of the bread.

16. The method according to claim 1 wherein the reducing of the temperature of the cooking cavity occurs during the introducing of the steam into the cooking cavity.

17. The method according to claim 16, wherein the reducing of the temperature of the cooking cavity comprises reducing a duty cycle of an upper heating element of the heating system.

18. The method according to claim 1 wherein the introducing steam further comprises introducing a gradually decreasing amount of steam into the cooking cavity.

19. The method according to claim 18 and further comprising terminating the introducing of the gradually decreasing amount of steam prior to the end of the cooking cycle.

20. The method according to claim 1 and further comprising running a convection fan during the cooking cycle to circulate air in the cooking cavity.

21. A method of baking bread using steam during a cooking cycle in an automated household oven with a cooking cavity, a steam system for introducing steam into the cooking cavity, a heating system for heating the cooking cavity, a control panel, and a controller operably coupled to and controlling the steam system, the heating system, and the control panel for implementing the cooking cycle, the method comprising:
receiving input from the user regarding the selection of a bread cooking cycle having a cooking time and cooking temperature via the control panel;
preconditioning the cooking cavity by actuating the heating system to increase the temperature of the cooking cavity to a first temperature greater than the cooking temperature and greater than a vaporization temperature of water;
indicating to the user the completion of the preconditioning of the cooking cavity via the control panel;
maintaining the temperature of the cooking cavity at the first temperature after the indicating to the user of the completion of the preconditioning of the cooking cavity
determining a presence of bread in the cooking cavity after the indicating to the user of the completion of the preconditioning of the cooking cavity based on at least one input received by the controller;
terminating the preconditioning of the cooking cavity after the determining of the presence of bread in the cooking cavity; and
after the terminating of the preconditioning of the cooking cavity, initiating the baking of the bread by:
reducing the temperature of the cooking cavity from the first temperature to the cooking temperature and then maintaining the temperature of the cooking cavity at the cooking temperature for the cooking time by actuating the heating system; and
introducing a gradually decreasing amount of steam into the cooking cavity by activating the steam system.

22. A method of baking bread using steam during a cooking cycle in an automated household oven with a cooking cavity, a steam system for introducing steam into the cooking cavity, a heating system for heating the cooking cavity, a control panel, and a controller operably coupled to and controlling the steam system, the heating system, and the control panel for implementing the cooking cycle, the method comprising:

receiving input from the user regarding the selection of a bread cooking cycle having a cooking time and cooking temperature via the control panel;

preconditioning the cooking cavity by actuating the heating system to increase the temperature of the cooking cavity to a first temperature greater than the cooking temperature and greater than a vaporization temperature of water;

indicating to the user via the control panel when the temperature of the cooking cavity reaches the first temperature;

maintaining the temperature of the cooking cavity at the first temperature after the indicating to the user of the completion of the preconditioning of the cooking cavity;

after the indicating, determining a presence of bread in the cooking cavity based on at least one input received by the controller;

after the indicating, maintaining the temperature of the cooking cavity at the first temperature until at least the determining of the presence of bread; and after the determining of the presence of bread, initiating the baking of the bread by:

reducing the temperature of the cooking cavity from the first temperature to the cooking temperature and then maintaining the temperature of the cooking cavity at the cooking temperature for the cooking time by actuating the heating system; and introducing steam into the cooking cavity by activating the steam system.

\* \* \* \* \*